United States Patent
Wang et al.

(10) Patent No.: US 8,069,268 B2
(45) Date of Patent: *Nov. 29, 2011

(54) RECYCLING ITEMS IN A NETWORK DEVICE

(75) Inventors: Zhong Wang, Santa Clara, CA (US); Yan Ke, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/729,749

(22) Filed: Mar. 23, 2010

(65) Prior Publication Data

US 2010/0180026 A1 Jul. 15, 2010

Related U.S. Application Data

(63) Continuation of application No. 10/990,338, filed on Nov. 17, 2004, now Pat. No. 7,716,380.

(51) Int. Cl.
*G06F 15/16* (2006.01)
(52) U.S. Cl. .................. 709/251; 370/452
(58) Field of Classification Search .................. 709/251; 370/452
See application file for complete search history.

(56) References Cited

U.S. PATENT DOCUMENTS

| | | | |
|---|---|---|---|
| 4,858,232 A | 8/1989 | Diaz et al. | |
| 6,334,153 B2 | 12/2001 | Boucher et al. | |
| 6,393,487 B2 | 5/2002 | Boucher et al. | |
| 6,674,713 B1 | 1/2004 | Berg et al. | |
| 6,859,841 B2 * | 2/2005 | Narad et al. | 709/236 |
| 7,337,241 B2 | 2/2008 | Boucher et al. | |
| 2002/0154357 A1 * | 10/2002 | Ozveren et al. | 359/124 |
| 2003/0182423 A1 | 9/2003 | Shafir et al. | |
| 2004/0064512 A1 | 4/2004 | Arora et al. | |
| 2004/0078462 A1 | 4/2004 | Philbrick et al. | |
| 2005/0055399 A1 | 3/2005 | Savchuk | |

OTHER PUBLICATIONS

Co-pending U.S. Appl. No. 10/990,338, filed Nov. 17, 2004 entitled "Recycling items in a network device" by Wang et al., 35 pages.

* cited by examiner

*Primary Examiner* — Phuoc Nguyen
(74) *Attorney, Agent, or Firm* — Harrity & Harrity, LLP

(57) ABSTRACT

A network device includes a data structure and an ager. The data structure includes a group of positions. One or more of the positions are associated with at least one item. The ager is configured to sequentially analyze each position of the group of positions, and recycle, at each analyzed position, any item associated with the analyzed position.

20 Claims, 11 Drawing Sheets

US 8,069,268 B2

RECYCLING ITEMS IN A NETWORK DEVICE

RELATED APPLICATIONS

This application is a continuation of U.S. patent application Ser. No. 10/990,338, filed Nov. 17, 2004, which is incorporated herein by reference.

FIELD OF THE INVENTION

Implementations consistent with the principles of the invention relate generally to communications networks and, more particularly, to recycling items in a network device.

BACKGROUND OF THE INVENTION

A typical communications network includes a lot of different types of network devices. For example, a typical communications network may include host devices, which act as the source or destination of a particular communication session, routers and/or switches, which act to forward communication session traffic toward their appropriate destinations, and security devices, which provide, for example, firewall or other security functionality.

A network device may store a separate communication session data structure for each communication session handled by the network device. The data structures may store current state information for the communication sessions. Typically, each communication session data structure may include a timer that indicates the lifetime of the communication session. At a predetermined interval (e.g., every second), an ager may scan each communication session data structure and decrease the associated timer in those instances when a new packet has not been received for that communication session. If a new packet has been received for a communication session, the ager may reset the timer for that communication session (e.g., reset the timer to its maximum value for that communication session). If a timer has expired (e.g., counted down from its maximum value to zero) for a particular communication session, the ager may recycle the corresponding communication session.

Therefore, during each time interval, the ager scans the data structures for all ongoing communication sessions. During this scanning process, processing of data packets may be blocked. Since network devices may handle thousands of ongoing communication sessions at one time, the ager may scan thousands of communication sessions during each time interval, decreasing throughput and consuming a large amount of processing power of the network device.

SUMMARY OF THE INVENTION

In a first implementation consistent with the principles of the invention, a method includes associating an item with a position on an aging ring, where the aging ring includes a group of positions; and determining whether to recycle the item based on the position on the aging ring.

In another implementation consistent with the principles of the invention, a network device includes a data structure and an ager. The data structure includes a group of positions. One or more of the positions are associated with at least one item. The ager is configured to sequentially analyze each position of the group of positions, and recycle, at each analyzed position, any item associated with the analyzed position.

In still another implementation consistent with the principles of the invention, a method includes associating ongoing communication sessions with an aging ring, where the aging ring includes a group of positions and each of the ongoing communication sessions is associated with one position of the group of positions; changing, for each ongoing communication session on which a data unit is received, a position with which the ongoing communication session is associated; sequentially analyzing each position of the group of positions; and disassociating, at each analyzed position, any ongoing communication session associated with the analyzed position.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the principles of the invention improve network device performance in a communications network. In an exemplary implementation, ongoing sessions are associated with an aging ring. An aging ring pointer may traverse the aging ring in a clock-wise manner. An ager follows the pointer around the aging ring and recycles any sessions that are detected at any aging ring position.

Exemplary Network

Figure 1:
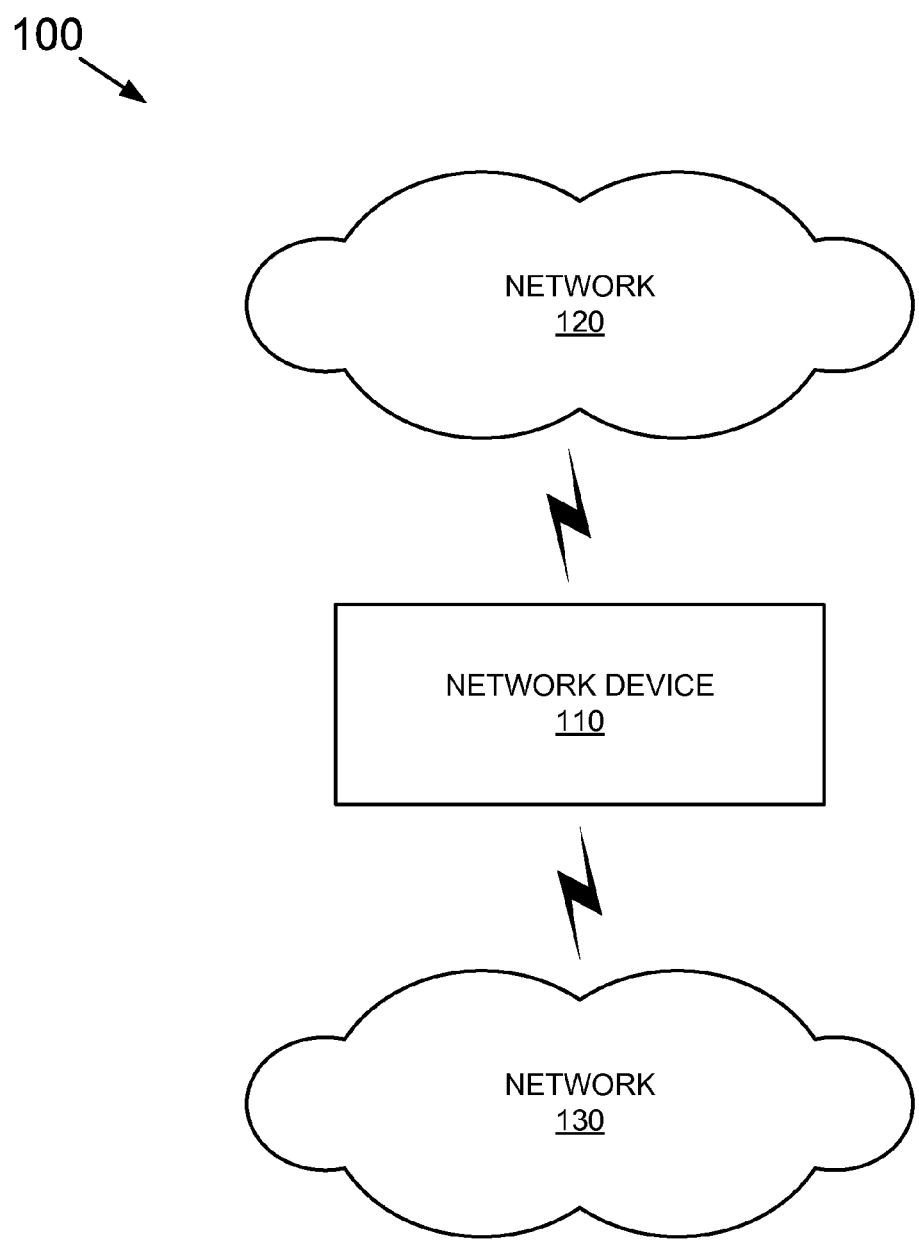
FIG. 1 is an exemplary diagram of a communications network in which systems and methods consistent with the principles of the invention may be implemented.

FIG. 1 is an exemplary diagram of a communications network 100 in which systems and methods consistent with the principles of the invention may be implemented. As illustrated, network 100 may include a network device 110 that forwards data units between networks 120 and 130. It will be appreciated that network 100 may include other devices (not shown) that aid in receiving, processing, and/or transmitting data units.

Network device 110 may include one or more network devices that receive data units (e.g., Internet Protocol (IP) packets) and forward the data units toward their destination(s). In some implementations, network device 110 may perform one or more security functions, such as filtering the data units. In one implementation, network device 110 may include a firewall. Network device 110 may connect to networks 120 and 130 via wired, wireless, and/or optical connections.

Networks 120 and 130 may include one or more networks capable of forwarding data units. Networks 120 and 130 may include, for example, a local area network (LAN), a wide area network (WAN), a telephone network, such as the Public Switched Telephone Network (PSTN), an intranet, the Internet, or a combination of networks. In one implementation, network 120 may include an untrusted network, such as the Internet, and network 130 may include a trusted network, such as a private network. In an alternative implementation consistent with the principles of the invention, one or more devices are connected directly to network device 110. These devices may communicate with devices on networks 120 and 130 via network device 110.

Figure 2:
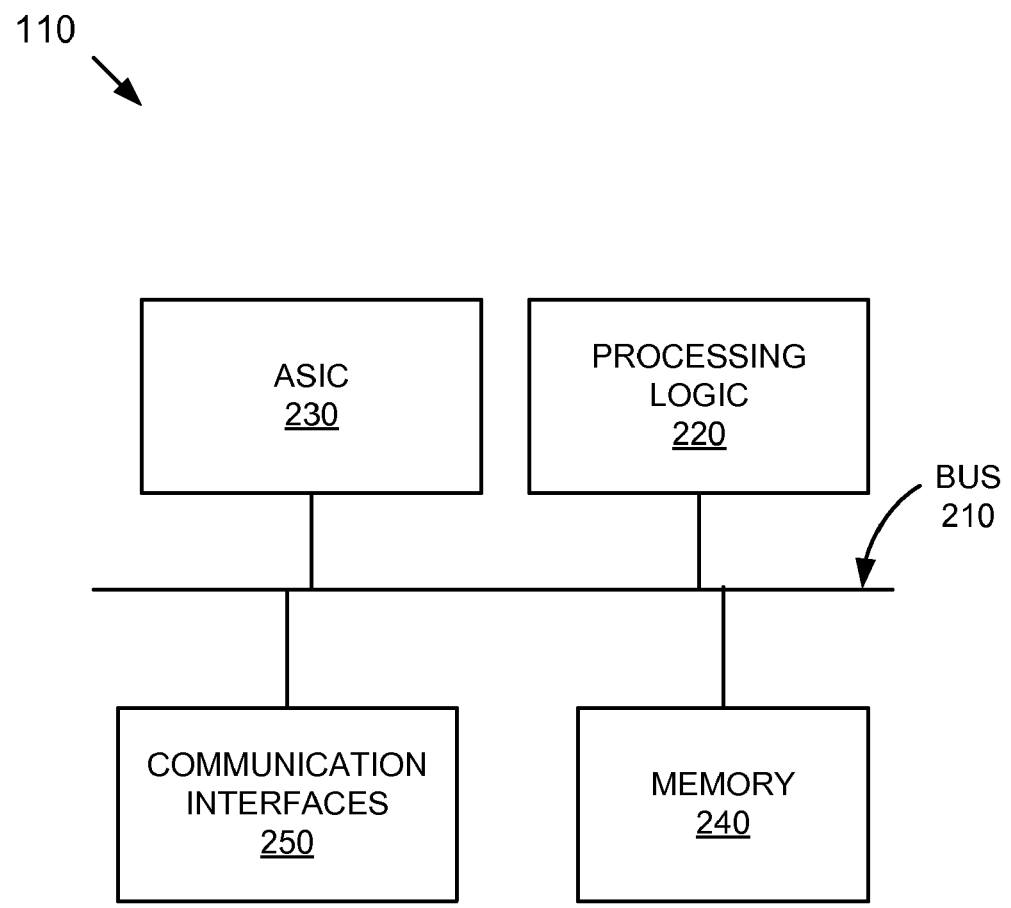
FIG. 2 is an exemplary configuration of the network device of FIG. 1 in an implementation consistent with the principles of the invention.

FIG. 2 is an exemplary configuration of network device 110 of FIG. 1 in an implementation consistent with the principles of the invention. As illustrated, network device 110 may include a bus 210, processing logic 220, an Application Specific Integrated Circuit (ASIC) 230, a memory 240, and a group of communication interfaces 250. Bus 210 permits communication among the components of network device 110.

Processing logic 220 may include any type of conventional processor or microprocessor that interprets and executes instructions. ASIC 230 may include one or more ASICs capable of performing network-related functions. In one implementation, ASIC 230 may perform a security-related function.

Memory 240 may include a random access memory (RAM) or another dynamic storage device that stores information and instructions for execution by processing logic 220; a read only memory (ROM) or another type of static storage device that stores static information and instructions for use by processing logic 220; and/or some other type of magnetic or optical recording medium and its corresponding drive. Communication interfaces 250 may include any transceiver-like mechanism that enables network device 110 to communicate with other devices and/or systems, such as devices associated with networks 120 and 130.

As will be described in detail below, network device 110, consistent with the principles of the invention, may perform network communications-related operations. Network device 110 may perform these and other operations in response to processing logic 220 executing software instructions contained in a computer-readable medium, such as memory 240. A computer-readable medium may be defined as one or more memory devices and/or carrier waves. The software instructions may be read into memory 240 from another computer-readable medium or from another device via a communication interface 250. The software instructions contained in memory 240 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Figure 3:
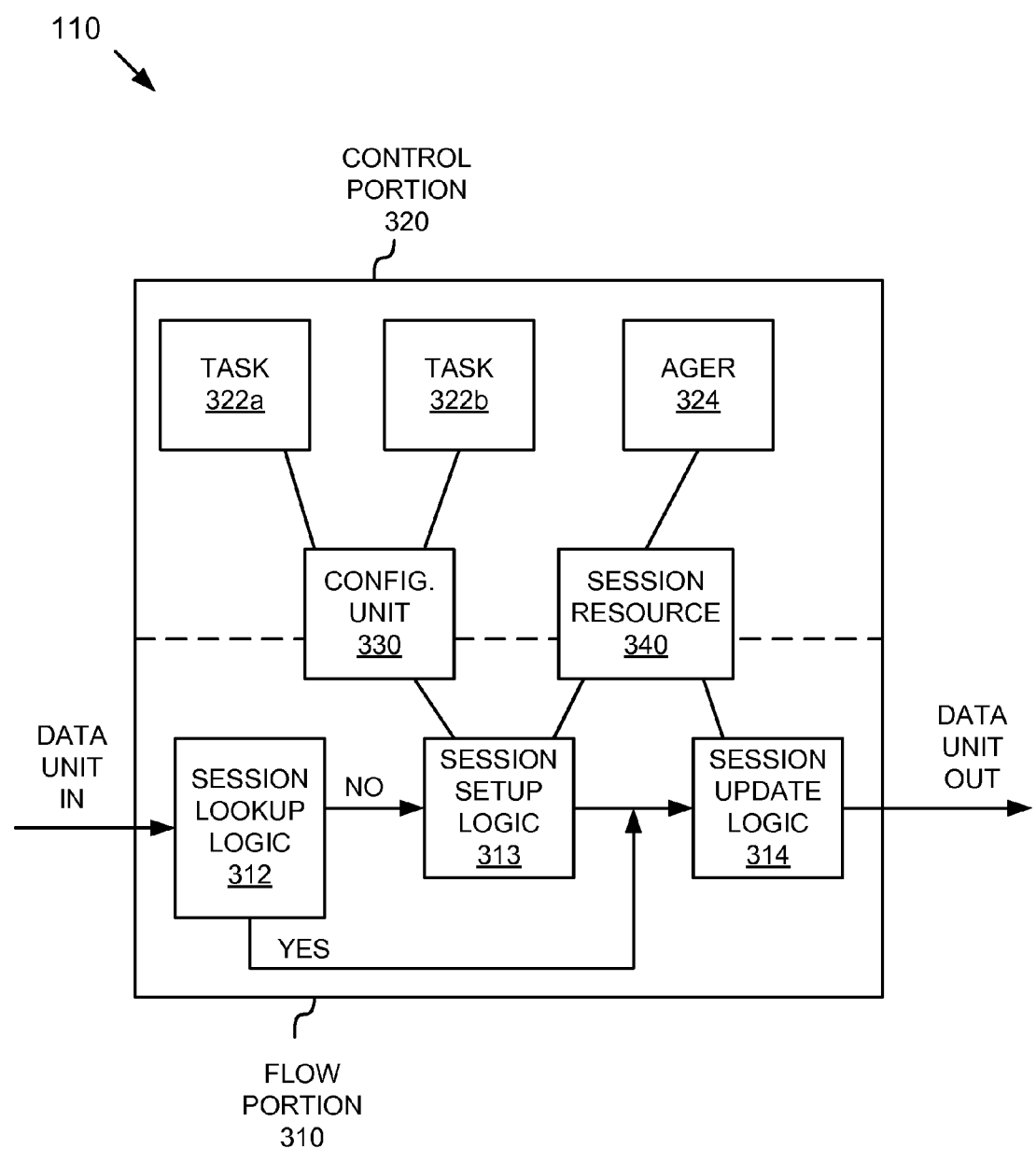
FIG. 3 is an exemplary functional block diagram of the network device of FIG. 1 in an implementation consistent with the principles of the invention.

FIG. 3 is an exemplary functional block diagram of network device 110 in an implementation consistent with the principles of the invention. As illustrated, network device 110 may include a flow portion 310 and a control portion 320. Network device 110 may also include a configuration unit 330 and a session resource 340.

Flow portion 310 may include session lookup logic 312, session setup logic 313, and session update logic 314. Session lookup logic 312 may receive a data unit and determine whether the data unit is part of an existing session. In one implementation, session lookup logic 312 may determine that a data unit is part of an existing session based on the source and destination addresses contained within the data unit. Session setup logic 313 may set up sessions for data units that are determined by session lookup logic 312 to not be a part of an existing (or ongoing) session. In one implementation, session setup logic 313 may, as part of setting up a new session, select a session identifier from a list of available session identifiers (referred to hereinafter as a "free list"). Session update logic 314 may update a data structure associated with the session of which a data unit that is to be transferred out of network device 110 is a part. The session data structure may track the state of a communication session between two end points (i.e., a source device and a destination device).

Control portion 320 may include a group of tasks 322*a* and 322*b* (referred to collectively as "tasks 322") and an ager 324. Tasks 322 may include routine tasks performed by network device 110. For example, tasks 322 may include security operations, such as filtering data units received at network device 110. Ager 324 may review session information and recycle those sessions that have expired (e.g., due to no data units being received on those sessions for a predetermined period of time). The functions of ager 324 are described in greater detail below.

Configuration unit 330 may store information that may be used to identify the processing that is to be performed on a communication session between a particular source/destination pair. The information may include rules or other types of information. Tasks 322 may interact with configuration unit 330 when processing received data units. For example, one of tasks 322 may identify one or more rules in configuration unit 330 for performing a filtering operation on a received data unit. Session setup logic 313 may interact with configuration unit 330 when setting up a new session for a received data unit.

Session resource 340 may store session information, such as session data structures, a session free list, and an aging ring. Session setup logic 313 may interact with session resource 340 to allocate a session to a received data unit. For example, session setup logic 313 may obtain a session identifier from the session free list stored in session resource 340. Session update logic 314 may interact with session resource 340 to update a session data structure associated with a particular data unit. Ager 324 may interact with session resource 340 to age out old sessions. As will be described in detail below, ager 324 may use the aging ring stored in session resource 340 to age out old sessions.

Figure 4:
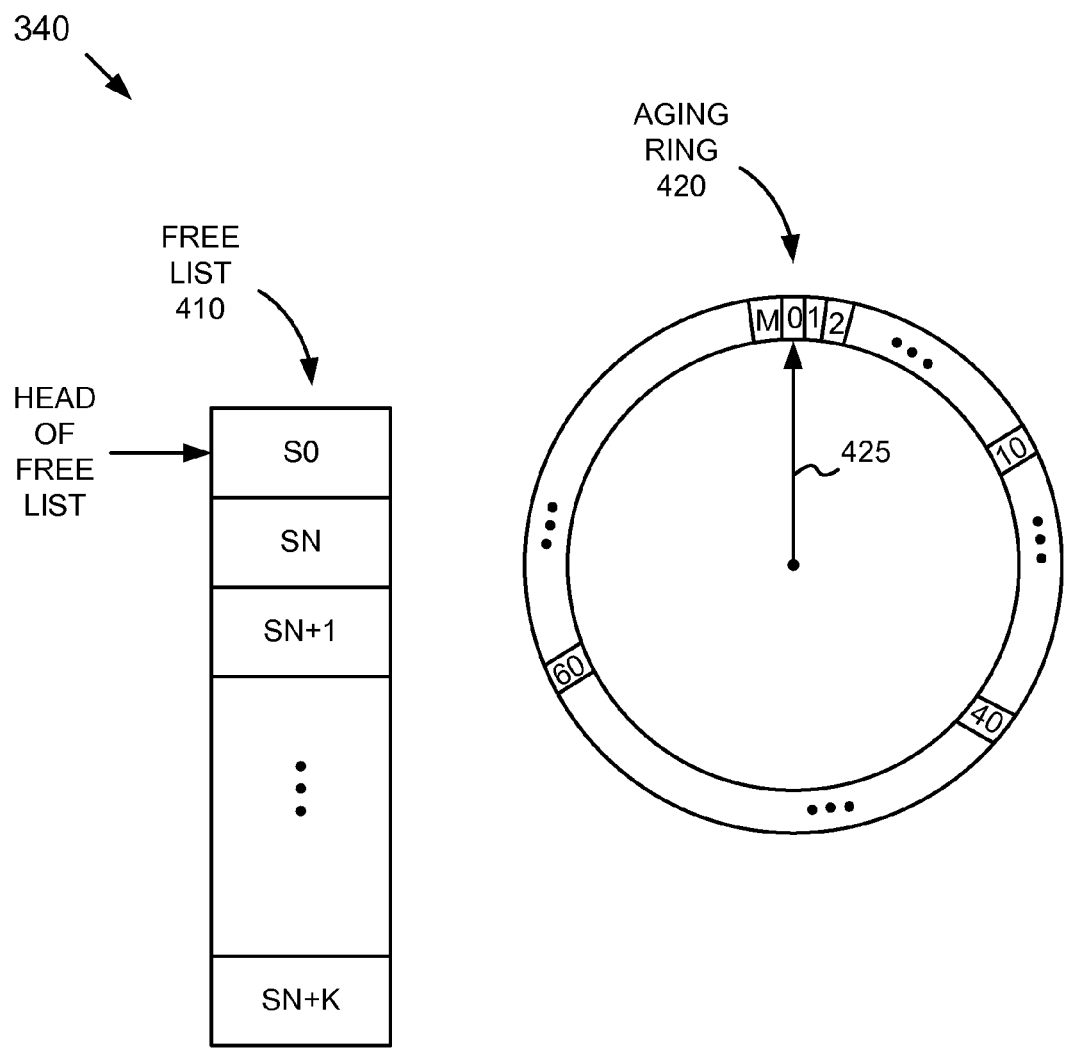
FIG. 4 is an exemplary configuration of the session resource of FIG. 3 in an implementation consistent with the principles of the invention.

FIG. 4 is an exemplary diagram of session resource 340 in an implementation consistent with the principles of the invention. As illustrated, session resource 340 may include a session free list 410 and an aging ring 420. It will be appreciated that session resource 340 may include other items than illustrated in FIG. 4. For example, as set forth above, session resource 340 may also store session data structures.

Session free list 410 may store a list of available session identifiers. When a new session is to be set up for a data unit, the session identifier at the head of free list 410 may be used for the data unit. As illustrated in FIG. 4, session S0 is at the head of free list 410. Once session S0 is used for a data unit, session SN may move to the head of free list 410. When a session is retired (or recycled), the session's identifier may be placed at the tail of free list 410.

Aging ring 420 may include a memory array. The number of positions in aging ring may be set to equal the maximum lifetime of the sessions handled by network device 110. A session's lifetime may be user configurable and indicate how long the session should exist when no data units are received on that session. In one implementation consistent with the principles of the invention, each position on aging ring 420 may correspond, for example, to a single second interval of a clock. Therefore, if the maximum lifetime of the sessions handled by network device 110 is one hour, aging ring 420 may include 3600 positions (numbered from 0 to 3599).

At each clock interval (e.g., at each second), ager 324 may analyze current position 425 of aging ring 420 and recycle any sessions associated with current position 425. For example, as illustrated in FIG. 4, ager 324 may analyze aging ring position 0. If any sessions are associated with aging ring position 0, ager 324 may recycle the session(s). After one second (or other time unit if the aging ring positions correspond to another time unit), current position 425 moves to the next aging ring position (i.e., position 1). Ager 324 may then analyze position 1. If any sessions are associated with aging ring position 1, ager 324 may recycle the session(s).

Exemplary Processing

Figure 5:
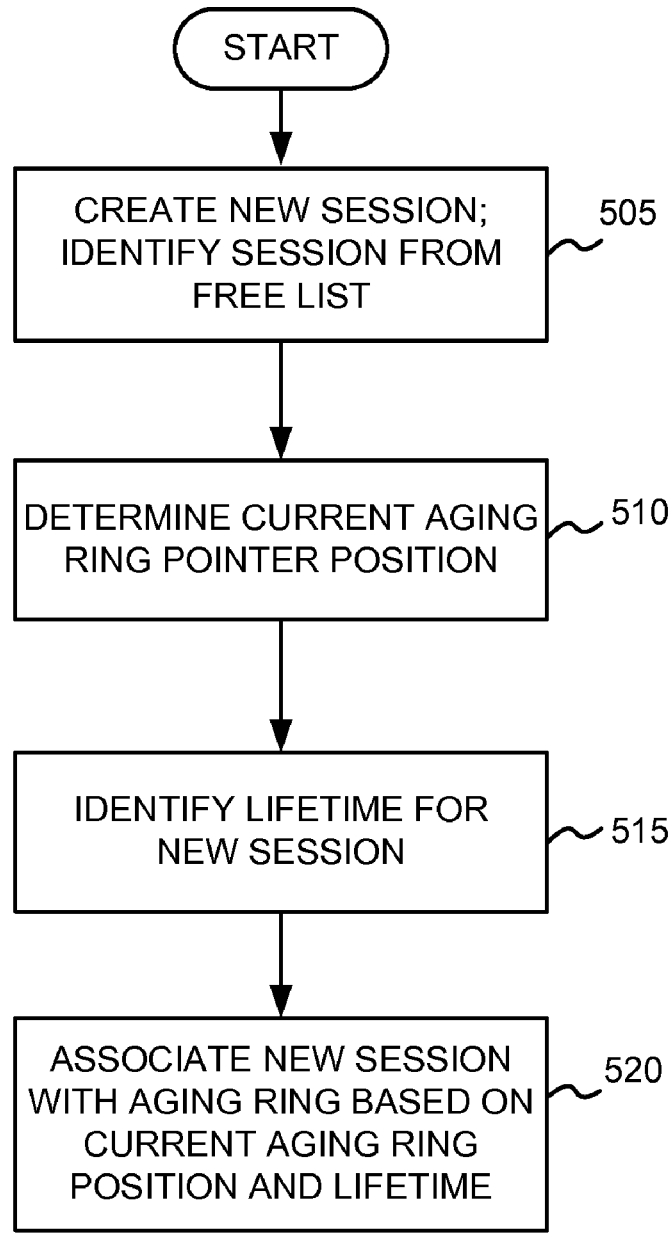
FIG. 5 is a flowchart of an exemplary process for associating sessions with an aging ring in an implementation consistent with the principles of the invention.

FIG. 5 is a flowchart of an exemplary process for associating sessions with aging ring 420 in an implementation consistent with the principles of the invention. The following acts may be performed by session setup logic 313 and/or another component within network device 110. Processing may begin with session setup logic 313 receiving a data unit for which a session has not yet been created (act 505). Upon receipt of a data unit, session lookup logic 312 may determine if the data unit is already part of a session. Session lookup logic 312 may make this determination based on the source address and/or destination address included in the data unit. If the data unit is not already part of a session, session setup logic 313 may identify a session from free list 410 (act 505). For example, session setup logic 313 may select the session at the head of free list 410.

Session setup logic 313 may determine the current aging ring pointer position (act 510). As set forth above, current ring pointer 425 may change each second as pointer 425 moves around aging ring 420. Session setup logic 313 may also identify the lifetime for the new session (act 515). A session's lifetime may be user configurable. For example, a user may set a lifetime value for sessions created between a particular source and destination pair. Session setup logic 313 may identify the lifetime value for a new session from, for example, configuration unit 330.

Session setup logic 313 may associate the new session with aging ring 420 based on current aging ring pointer 425 position and the identified session lifetime (act 520). For example, if current aging ring pointer 425 position is 0 and the session's lifetime is 60 seconds, then the session may be associated with aging ring 420 at position 60 (0(current pointer position)+60 (session's lifetime)). For example, session setup logic 313 may store a pointer to the new session in a location in aging ring 420 corresponding to position 60.

Figure 6:
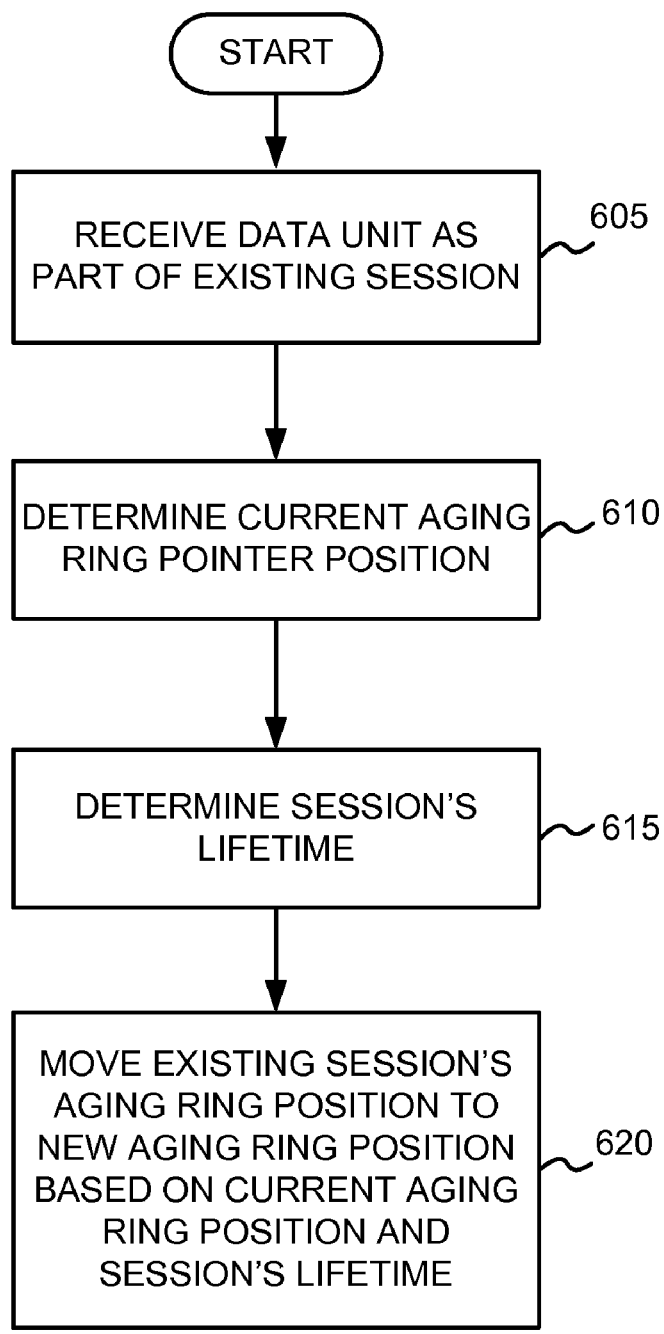
FIG. 6 is a flowchart of an exemplary process for updating a session's position on an aging ring in an implementation consistent with the principles of the invention.

FIG. 6 is a flowchart of an exemplary process for updating a session's position on aging ring 420 in an implementation consistent with the principles of the invention. The following processing may be performed by session update logic 314 and/or another component within network device 110. Processing may begin with session update logic 314 receiving a data unit that is part of an existing session (act 605). Upon receipt of a data unit, session lookup logic 312 may determine if the data unit is already part of a session. Session lookup logic 312 may make this determination based on the source address, destination address, source port, destination port, and/or the communication protocol. If the data unit is already part of a session, session lookup logic 312 may forward the data unit to session update logic 314. Session update logic 314 may determine a current aging ring pointer position (act 610). Assume, for example, that pointer 425 is currently pointing to aging ring position 10.

Session update logic 314 may determine the session's lifetime (act 615). In one implementation, session update logic 314 may obtain the session's lifetime value from the session's data structure stored in session resource 340. Assume, for explanatory purposes, that the session's lifetime is determined to be 60 seconds. Session update logic 314 may move the session's aging ring position to a new position based on the current aging ring pointer position and the session's lifetime (act 620). Based on the exemplary values set forth above, session update logic 314 may move the session's aging ring position to position 70 (10(current ring pointer position)+60 (session's lifetime)).

In an alternative implementation consistent with the principles of the invention, a marker may be set at a session's current position on aging ring 420 when a data unit is received that causes the session's position to change. The marker may indicate the new position on aging ring 420 where the session should be moved. When ager 324 reaches the session's current position, ager 324 may move the session to the new position based on the marker.

Figure 7:
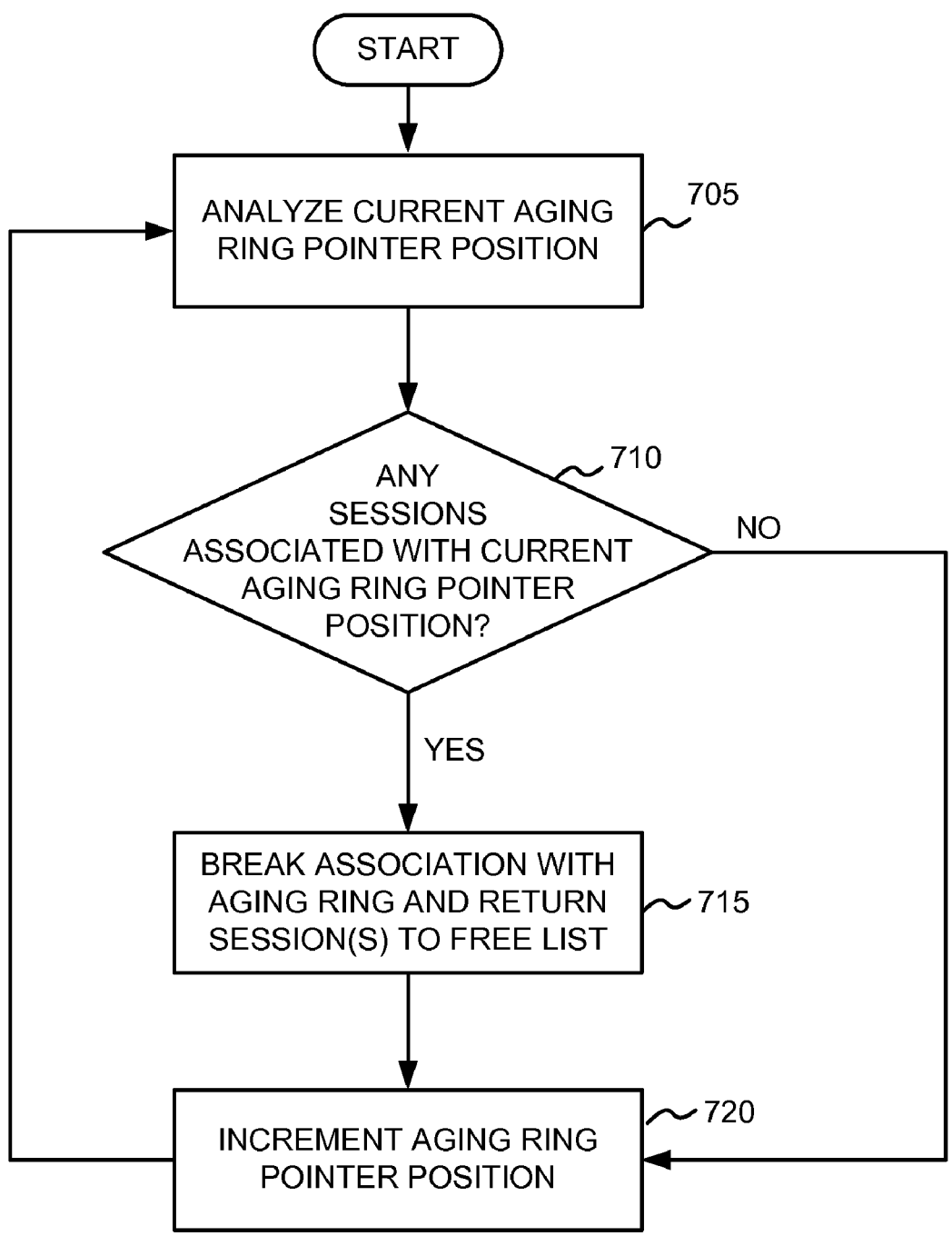
FIG. 7 is a flowchart of an exemplary process for recycling a session in an implementation consistent with the principles of the invention.

FIG. 7 is a flowchart of an exemplary process for recycling a session in an implementation consistent with the principles of the invention. The following processing may be performed by ager 324 and/or another component of network device 110. Processing may begin with ager 324 analyzing the current position of aging ring pointer 425 (act 705). In analyzing the current aging ring pointer position, ager 324 may determine whether a session is associated with the current pointer position (act 710). If a session is associated with current aging ring pointer 425 position, ager 324 may break the session's association with aging ring 420 and return the session to free list 410 (act 715). In one implementation, ager 324 may return the session to the tail of free list 410 thereby making the session available for use between a source and destination pair. By returning a session to free list 410, the session is, in essence, recycled. The current pointer position of aging ring pointer 425 may be incremented (act 720). For example, if current pointer position of aging ring pointer 425 is position 10, the current pointer position of aging ring pointer 425 may be changed to position 11 at the next time interval.

Figure 8:
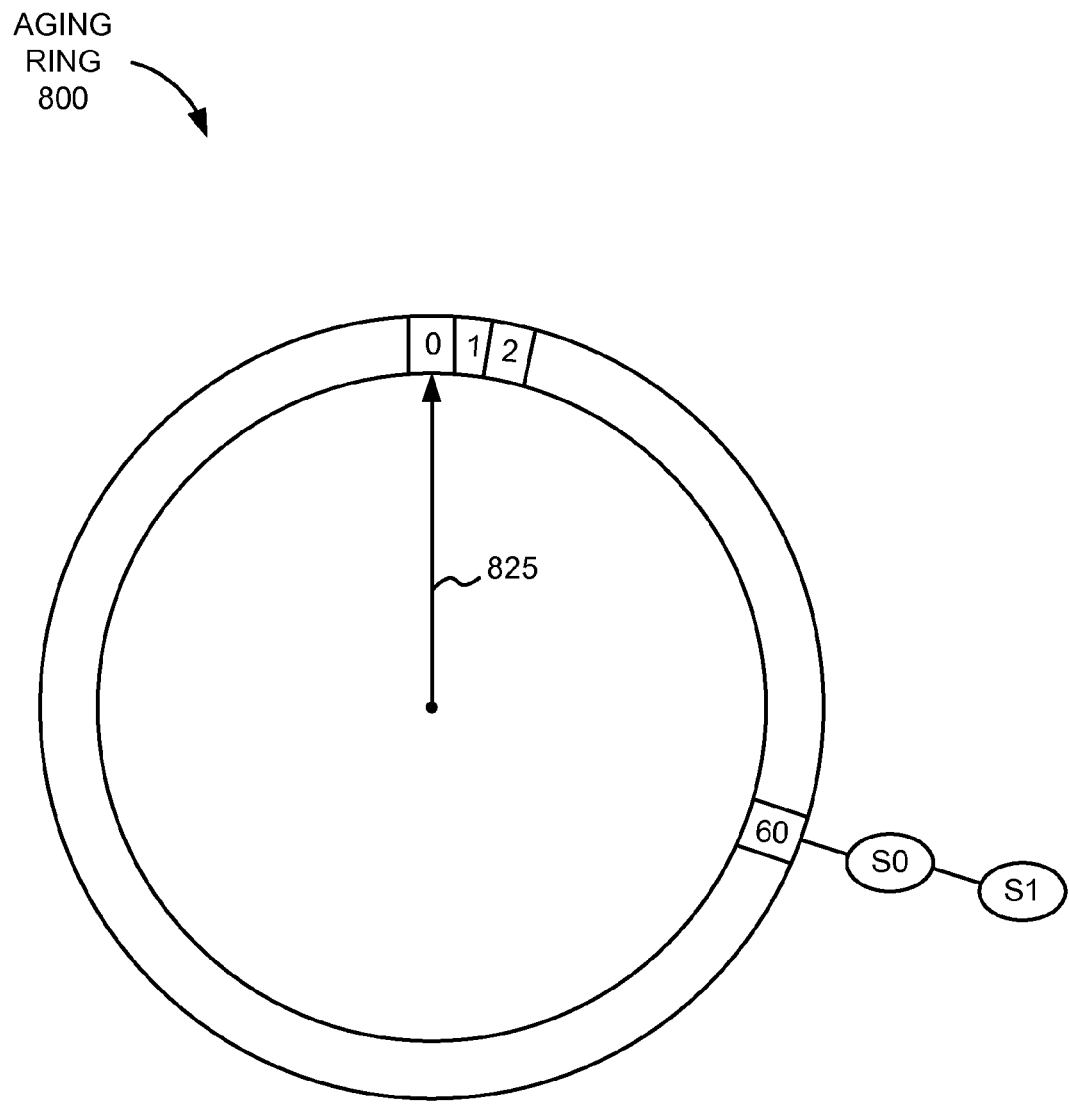
FIGS. 8-11 are exemplary diagrams of the aging ring in an implementation consistent with the principles of the invention.

The following example illustrates the above processing. With reference to FIG. 8, assume that a current pointer 825 position of aging ring 800 is 0. Moreover, assume that two data units are received while current pointer 825 position is 0 and that two sessions, S0 and S1, are set up, where each session S0 and S1 has a lifetime of 60 seconds. These new sessions S0 and S1 may be associated with aging ring 800 at position 60 (0(current pointer position)+60 (sessions' lifetimes)).

Figure 9:
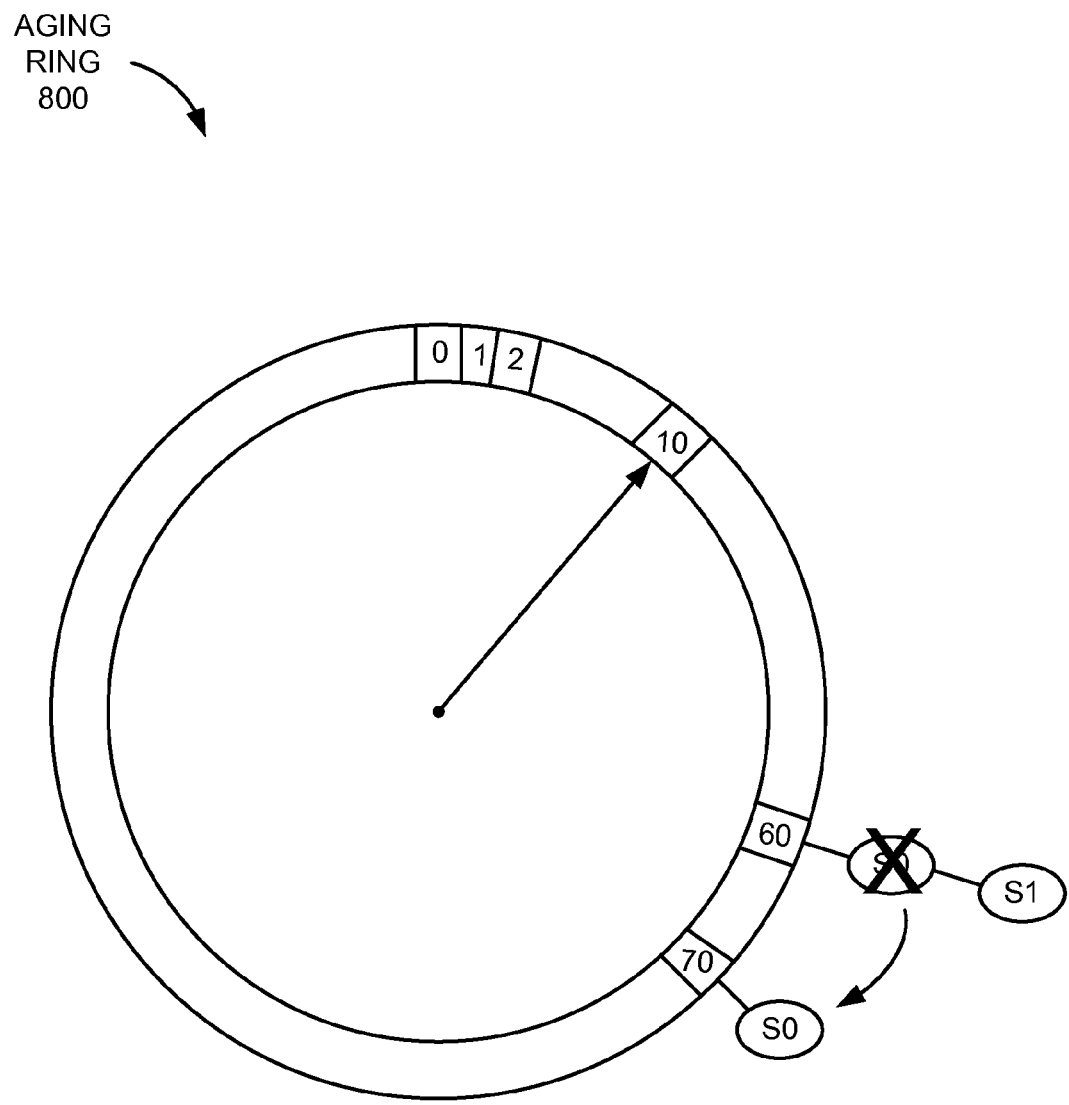

As the aging ring's pointer moves from position to position (e.g., every second), ager 324 may analyze each aging ring position to determine whether any sessions are associated with the positions. Assume that while at aging ring position 10, a new data unit is received on session S0. In response, session update logic 314 may, as illustrated in FIG. 9, move session S0's aging ring position from position 60 to position 70 (10(current aging ring pointer position)+60 (session S0's lifetime)).

Figure 10:
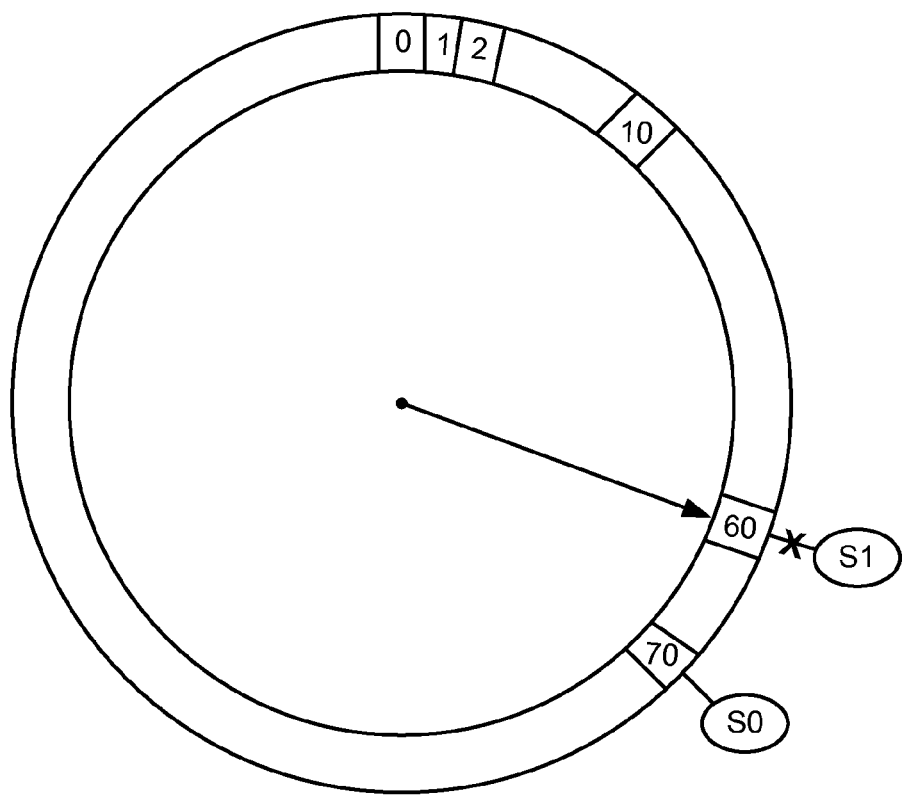

Ager 324 may continue to analyze aging ring pointer positions as the pointer moves around aging ring 800. Assume that the aging ring pointer moves to position 60 and that no data unit has been received on session S1. Ager 324 may, as illustrated in FIG. 10, break session S1's association with aging ring 800 and return session S1 to the tail end of free list 410.

Figure 11:
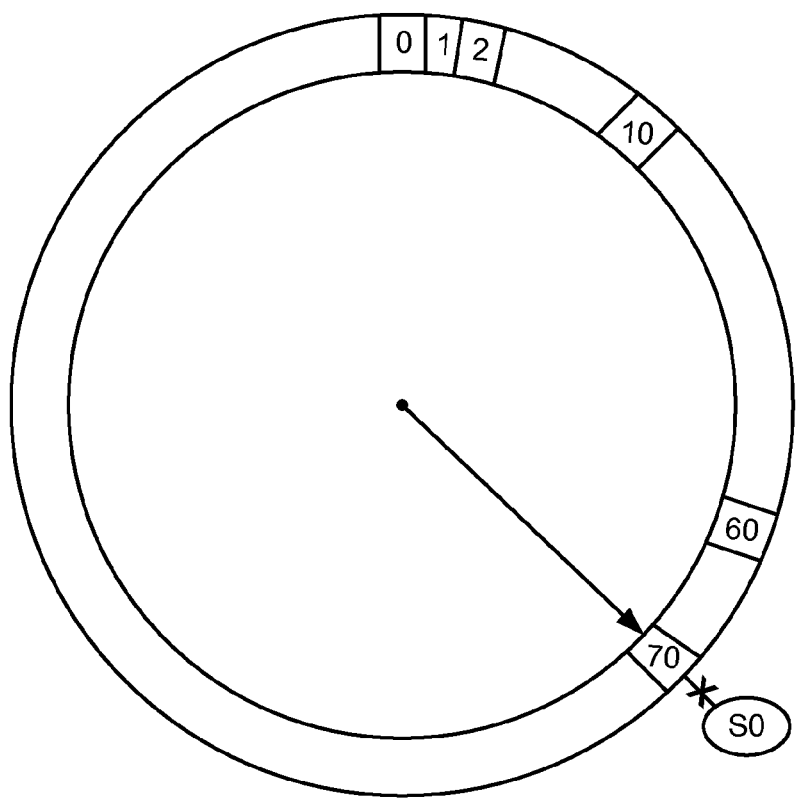

Ager 324 may continue to analyze aging ring pointer positions as the pointer moves around aging ring 800. Assume that the aging ring pointer moves to position 70 and that no data unit has been received on session S0 since the data unit that was received when the aging ring pointer was at position 10. Ager 324 may, as illustrated in FIG. 11, break session S0's association with aging ring 800 and return session S0 to the tail end of free list 410.

Therefore, unlike conventional techniques that analyze (or scan) all existing sessions' data structures every clock time unit (e.g., every second), implementations consistent with the principles of the invention analyze (or scan) only those sessions that are associated with the current pointer position of the aging ring. As a result, considerable computational time is saved. To illustrate the computational savings, assume that network device 110 has two existing sessions S0 and S1 and that sessions S0 and S1 are both associated with aging ring position 60, as illustrated in FIG. 8. Moreover, assume that the current aging ring pointer position is 0. Using conventional techniques, ager 324 would scan the data structures for sessions S0 and S1 each second as the aging ring pointer moves from position 0 to position 60, resulting in 120 session data structure scans. In implementations consistent with the principles of the invention, the data structures of sessions S0 and S1 would be scanned once when the current aging ring pointer position reaches 60. As a result, considerable computation time is saved.

Moreover, it will be appreciated that when ager 324 is scanning a session data structure, traffic does not traverse network device 110. Therefore, implementations consistent with the principles of the invention minimize the impact of session scanning, thereby increasing the throughput of network device 110.

Conclusion

Systems and methods consistent with the principles of the invention improve network device performance in a communications network. In an exemplary implementation, existing sessions are associated with an aging ring. An aging ring pointer traverses the aging ring in a clock-wise manner. An ager follows the pointer around the aging ring and recycles any sessions that are detected at any aging ring position.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while the above description focused on recycling sessions, it will be appreciated that the techniques described herein are equally applicable to other items that are to be recycled.

While series of acts have been described with regard to FIGS. 5-7, the order of the acts may be varied in other implementations consistent with the invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   associating, by a processor of a network device, an item with a position on an aging ring, the aging ring including a plurality of positions;
   analyzing, by the processor, at least one of the positions of the aging ring;
   determining, by the processor, whether the item is associated with a particular analyzed position on the aging ring; and
   upon determining that the item is associated with the particular analyzed position on the aging ring, recycling the item.

2. The method of claim 1, further comprising:
   determining a current position of the item on the aging ring;
   determining a lifetime of the item;
   determining a new position of the item on the aging ring based on the current position and the determined lifetime of the item; and
   associating the item with the new position on the aging ring.

3. The method of claim 2, where the determining the new position includes:
   adding a value representing the current position and a value representing the lifetime to obtain the new position.

4. The method of claim 1, where the item represents a communication session.

5. The method of claim 4, further comprising:
   receiving a data unit on the communication session; and
   moving the position of the communication session on the aging ring to a new position upon receiving the data unit on the communication session.

6. The method of claim 5, where the moving includes:
   determining a position of the communication session on the aging ring upon receiving the data unit,
   determining a lifetime of the communication session, and
   determining the new position based on the determined position and the lifetime of the communication session.

7. The method of claim 6, where the determining the new position includes:
   adding a value representing the determined position and a value representing the lifetime, where a sum of the values representing the determined position and the lifetime corresponds to the new position.

8. The method of claim 1, further comprising:
   sequentially analyzing each position on the aging ring, where sequentially analyzing a first position on the aging ring includes determining whether an item is associated with the first position on the aging ring; and
   upon analyzing each position on the aging ring, recycling an when the analyzed position is associated with an item.

9. A device comprising:
a memory to store a data structure that includes a plurality of positions; and
logic to:
  associate an item with a position in the data structure;
  analyze one or more positions in the data structure to determine whether the item is associated with a particular position in the data structure; and
  recycle the item upon determining that the item is associated with the particular position in the data structure.

10. The device of claim 9, where the data structure includes an aging ring.

11. The device of claim 9, where the item represents a communication session.

12. The device of claim 9, where the logic is further to:
analyze the particular position on a periodic interval.

13. The device of claim 12, where the periodic interval is based on a number of positions in the data structure.

14. The device of claim 9, where one or more items are associated with the data structure, where each of the one or more items is associated with a lifetime value, where the number of positions in the data structure is associated with a highest lifetime value of the lifetime values associated with the one or more items.

15. A method, comprising:
  associating, by a processor of a network device, ongoing communication sessions with an aging ring, the aging ring including a plurality of positions and each of the ongoing communication sessions being associated with one position of the plurality of positions;
  receiving, by the network device, a data unit that is associated with a particular ongoing communication session that is associated with a particular position of the plurality of positions;
  changing, by the processor, for the particular ongoing communication session, upon receiving the data unit, the position with which the ongoing communication session is associated;
  sequentially analyzing, by the processor, each position of the plurality of positions; and
  disassociating, by the processor, at each analyzed position, any ongoing communication session associated with the analyzed position.

16. The method of claim 15, where changing the position with which the particular ongoing communication session is associated includes identifying a new position, of the plurality of positions, for the particular ongoing communication session.

17. The method of claim 16, where identifying the new position includes identifying the new position based on a lifetime value, associated with the particular ongoing communication session, that indicates an amount of time that the particular ongoing communication session should exist when no data units are received on the particular ongoing communication session.

18. The method of claim 15, further comprising:
  placing a disassociated ongoing communication session in a free list of available communication sessions.

19. The method of claim 15, where sequentially analyzing each position, of the plurality of positions, includes analyzing each position at a specific time interval.

20. The method of claim 15, where a particular analyzed position is associated with two or more ongoing communication sessions, the method further comprising:
  disassociating at the particular analyzed position, the two or more ongoing communication sessions associated with the particular analyzed position.

* * * * *